United States Patent [19]
Carter, Jr.

[11] Patent Number: 5,853,145
[45] Date of Patent: Dec. 29, 1998

[54] ROTOR HEAD FOR ROTARY WING AIRCRAFT

[75] Inventor: Jay W. Carter, Jr., Burkburnett, Tex.

[73] Assignee: Cartercopters, LLC, Wichita Falls, Tex.

[21] Appl. No.: 4,405

[22] Filed: Jan. 8, 1998

Related U.S. Application Data

[60] Provisional application No. 60/035,035 Jan. 9, 1997.

[51] Int. Cl.⁶ .................................................. B64C 27/52
[52] U.S. Cl. .................................. 244/17.25; 244/17.27; 416/134 A; 416/138; 416/141; 416/148
[58] Field of Search ............................. 244/17.25, 17.27, 244/60; 416/134 A, 138, 141, 148

[56] References Cited

U.S. PATENT DOCUMENTS

| | | | |
|---|---|---|---|
| 2,023,105 | 12/1935 | Smith | 244/17.25 |
| 2,068,616 | 1/1937 | Wilford . | |
| 2,265,366 | 12/1941 | Hafner . | |
| 2,352,342 | 6/1944 | Pitcairn . | |
| 2,421,364 | 5/1947 | De La Cierva . | |
| 2,428,200 | 9/1947 | Campbell . | |
| 2,631,679 | 3/1953 | Hiller, Jr. et al. | 244/17.27 |
| 2,648,387 | 8/1953 | Doman | 244/17.27 |
| 2,684,722 | 7/1954 | Perry . | |
| 2,739,769 | 3/1956 | Rogers | 244/17.27 |
| 3,002,569 | 10/1961 | Doblhoff . | |
| 3,384,184 | 5/1968 | Schramm | 244/17.25 |
| 3,451,484 | 6/1969 | Sawicki et al. . | |
| 3,486,717 | 12/1969 | Paine . | |
| 3,504,989 | 4/1970 | Kisovec | 416/141 |
| 3,647,315 | 3/1972 | Rostad et al. . | |
| 3,698,663 | 10/1972 | Balke et al. . | |
| 3,720,387 | 3/1973 | Foote | 244/17.25 |
| 3,784,319 | 1/1974 | Amer et al. | 416/148 |
| 3,957,227 | 5/1976 | Baskin | 244/17.25 |
| 3,972,491 | 8/1976 | Ferris et al. | 244/17.27 |
| 3,999,726 | 12/1976 | Carlson et al. . | |
| 4,008,980 | 2/1977 | Noehren et al. . | |
| 4,092,084 | 5/1978 | Barltrop | 416/141 |
| 4,104,003 | 8/1978 | Mouille . | |
| 4,115,031 | 9/1978 | Drees et al. . | |
| 4,361,415 | 11/1982 | Aubry | 416/134 A |
| 4,381,902 | 5/1983 | Head et al. . | |
| 4,630,998 | 12/1986 | Leman et al. | 416/134 A |
| 4,805,850 | 2/1989 | Flux et al. | 244/17.25 |
| 4,877,375 | 10/1989 | Desjardins | 416/134 A |
| 4,912,999 | 4/1990 | Franks et al. | 244/17.25 |
| 5,135,357 | 8/1992 | Pancotti | 416/134 A |
| 5,165,854 | 11/1992 | Cicare | 416/148 |
| 5,209,640 | 5/1993 | Moriya . | |
| 5,266,005 | 11/1993 | Aubry | 416/134 A |
| 5,301,900 | 4/1994 | Groen et al. . | |
| 5,304,036 | 4/1994 | Groen et al. | 416/102 |

*Primary Examiner*—Robert J. Oberleitner
*Assistant Examiner*—Charles D. Ducher
*Attorney, Agent, or Firm*—James E. Bradley

[57] ABSTRACT

A flexible beam rotor assembly for an aircraft includes a rotor spar having an axis of rotation and a hole through which the axis of rotation passes. A spindle has a teetering connection to the rotor spar, the teetering connection having a teetering axis above the rotor spar at the rotor axis of rotation. A spindle housing is nonrotatably mounted to the aircraft and rotatably receives the spindle. The spindle housing and spindle protrude through the hole in the rotor spar and are tiltable in response to pilot control on a left-right spindle pivot axis and a fore-aft spindle pivot axis. The left-right spindle pivot axis and the fore-aft spindle pivot axis are located below the teetering axis and above the rotor at the rotor axis of rotation. A pylon is pivotally mounted to the fuselage for fore and aft movement relative to the fuselage to absorb vibration due to rotation of the rotor during forward flight of the aircraft. The spindle housing is attached to the pylon by a universal joint. A pair of pylon arms are pivotally connected to a lower end of the pylon. A pair of pushrods are pivotally connected between the pylon arms and the spindle housing. The pylon, spindle housing, arms, and pushrods form a parallelogram which allows the spindle to move fore and aft to absorb vibration without changing spindle tilt.

15 Claims, 5 Drawing Sheets

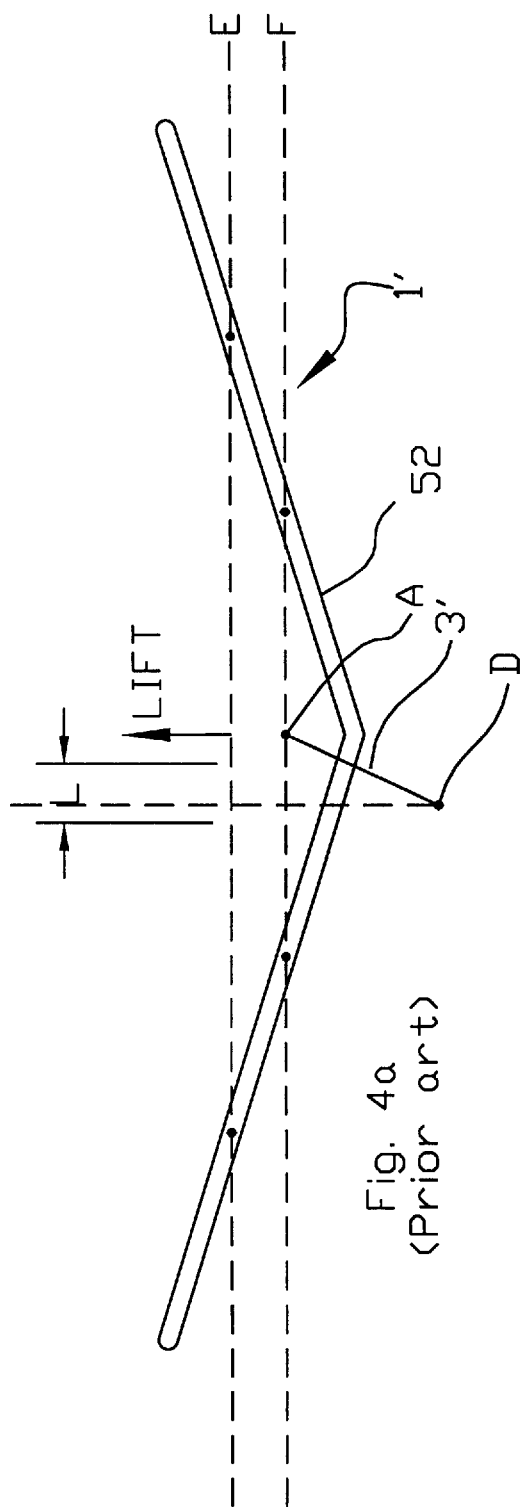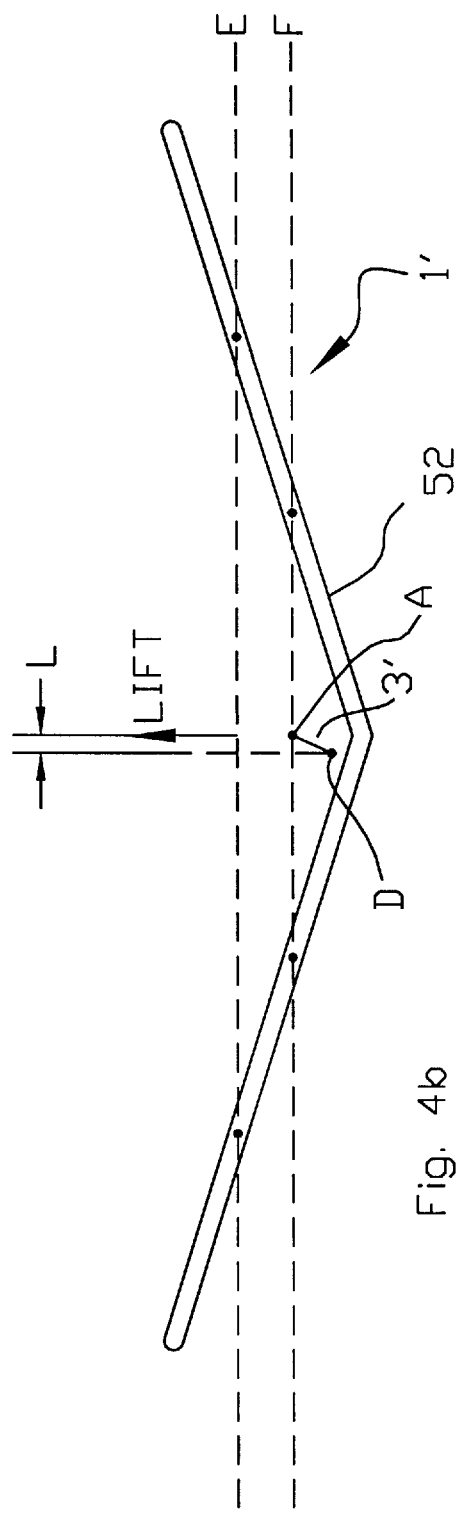

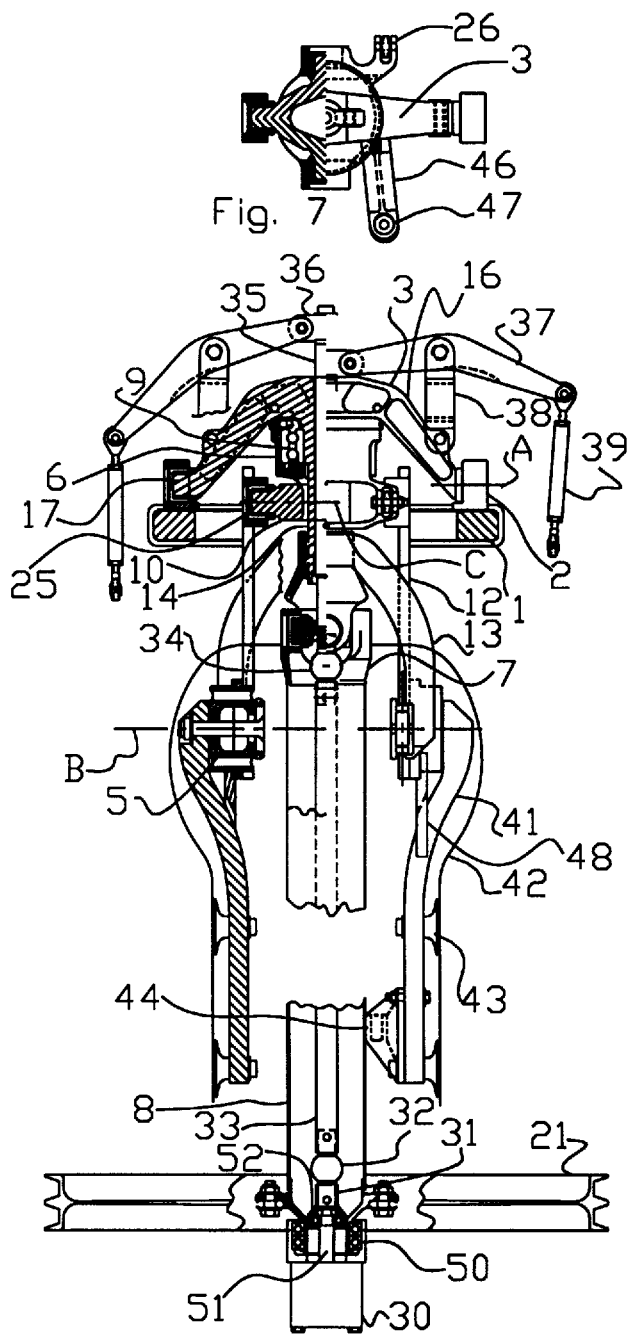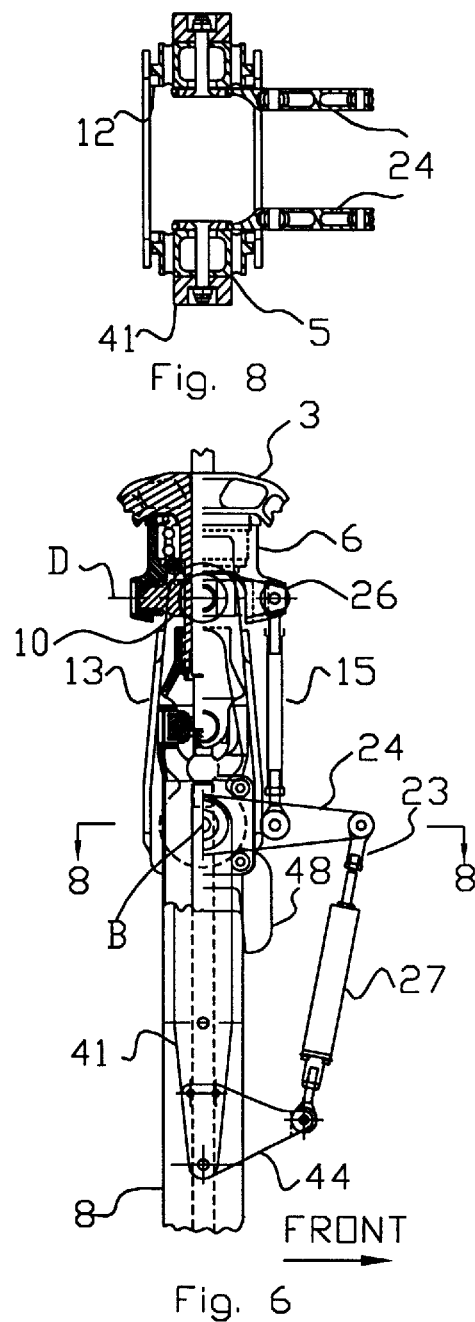
Fig. 7
Fig. 8
Fig. 6
Fig. 5

ROTOR HEAD FOR ROTARY WING AIRCRAFT

This application claims the benefit of U.S. Provisional application Ser. No. 60/035,035, filed Jan. 9, 1997.

TECHNICAL FIELD

This invention relates to an improved rotor head for rotary wing aircraft.

BACKGROUND ART

The basic technology of rotor heads was developed in the 1930s for autogyros. The first rotor heads incorporated a tilting spindle, in which the axis of rotation of the rotor controls the direction of lift. The tilting spindle is the simplest type of rotor head, but at the time there was no known way to avoid a large distance between the teetering axis and the rotor center of gravity. This large distance caused high vibration feedback to the pilot during rotor flapping. Also, there was no known way to avoid a large distance between the pivot axis and the rotor center of lift, causing high control forces.

U.S. Pat. No. 4,115,031 describes in detail an underslung teetering rotor. An underslung rotor is the best method of placing the teetering axis close to the rotor center of gravity to reduce vibration feedback to the pilot during rotor flapping.

The prior art does not include any method for locating the spindle pivot axis close to the rotor center of lift. Because of this problem, the tilting spindle type of rotor has never been successfully applied on heavy aircraft, since the control forces would be too large. One major reason why modern helicopters use a swashplate type of rotor head to cyclically change rotor blade pitch is to avoid the high control forces of prior art tilting spindle rotor heads.

U.S. Pat. No. 5,304,036 shows a continuously variable collective in a teetering (two-bladed) rotor autogyro. As early as 1939 the Kellett XR-3 autogyro had a continuously variable collective. The Kellett XR-3 used a three-bladed rotor, as was used in all successful autogyros of that era, because problems in two-bladed rotors unrelated to collective were unsolved at the time. more recent three-bladed autogyro, the prototype by Umbaugh (that later became Air & Space), had a continuously variable collective. The feature was removed in production versions of the Air and Space (in favor of a two-position collective) to simplify the aircraft control system. In 1947, U.S. Pat. No. 2,421,364 described many variations of automatic control of continuously variable pitch. U.S. Pat. No. 2,265,366 issued in 1941 clearly implies as common knowledge that rotor blade pitch should be adjustable in flight. Finally, all helicopters have continuously variable collective and many of them use two-bladed rotors.

DISCLOSURE OF INVENTION

Accordingly, a primary object of this invention is an improved rotor head which is simpler and lighter than the prior art yet provides functionality suitable for autogyro or helicopter application.

Another primary object of this invention is a spindle-type rotor head having low vibration feedback characteristics and low control forces even for heavy aircraft.

Another primary object of this invention is a pylon mounting system which further isolates fore-aft vibration from the aircraft without affecting control precision.

Another primary object of this invention is a rotor head capable of vertical takeoffs by pre-rotating the rotor up to a high rotational speed at zero rotor blade pitch, then increasing the rotor blade pitch for takeoff, and capable of vertical landings by having continuously variable collective.

BRIEF DESCRIPTION OF DRAWINGS

FIGS. 4a is a schematic diagram illustrating the position for the spindle pivot axis in prior art rotor wing aircraft.

FIG. 4b is a schematic diagram illustrating the position for the spindle pivot axis of the rotor head of FIG. 1.

FIG. 5 shows a partially sectioned front view of the rotor head, controls, and prerotator of FIG. 1.

FIG. 6 shows a partially sectioned side view of the rotor head and controls of the rotor head of FIG. 1.

FIG. 7 shows a partially sectioned top view of the rotor head of FIG. 1.

FIG. 8 is a sectional view of the rotor head of FIG. 1 taken along the line 8—8 of FIG. 6.

BEST MODE FOR CARRYING OUT THE INVENTION

Figure 1:
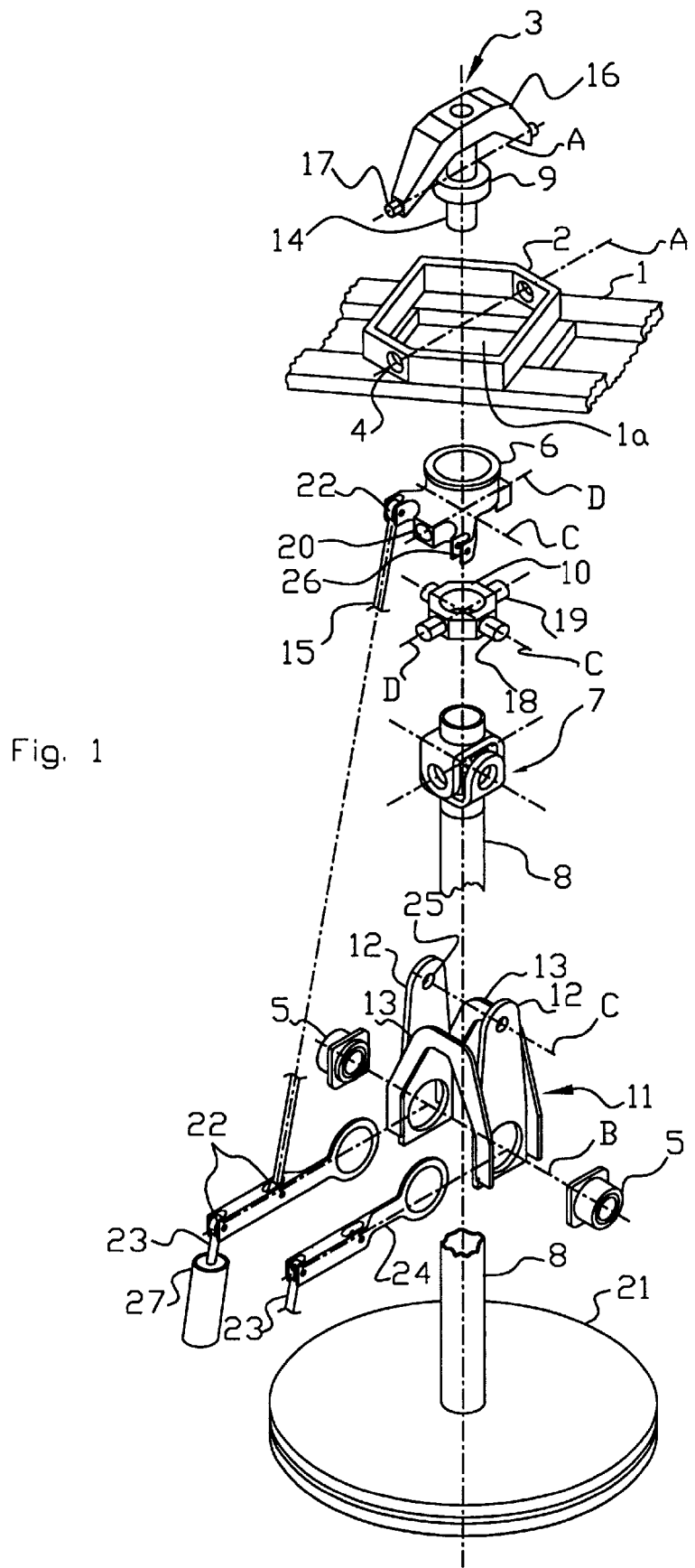
FIG. 1 shows a exploded isometric view of a rotor head constructed in accordance with this invention, omitting the pitch control mechanism.
Figure 3:
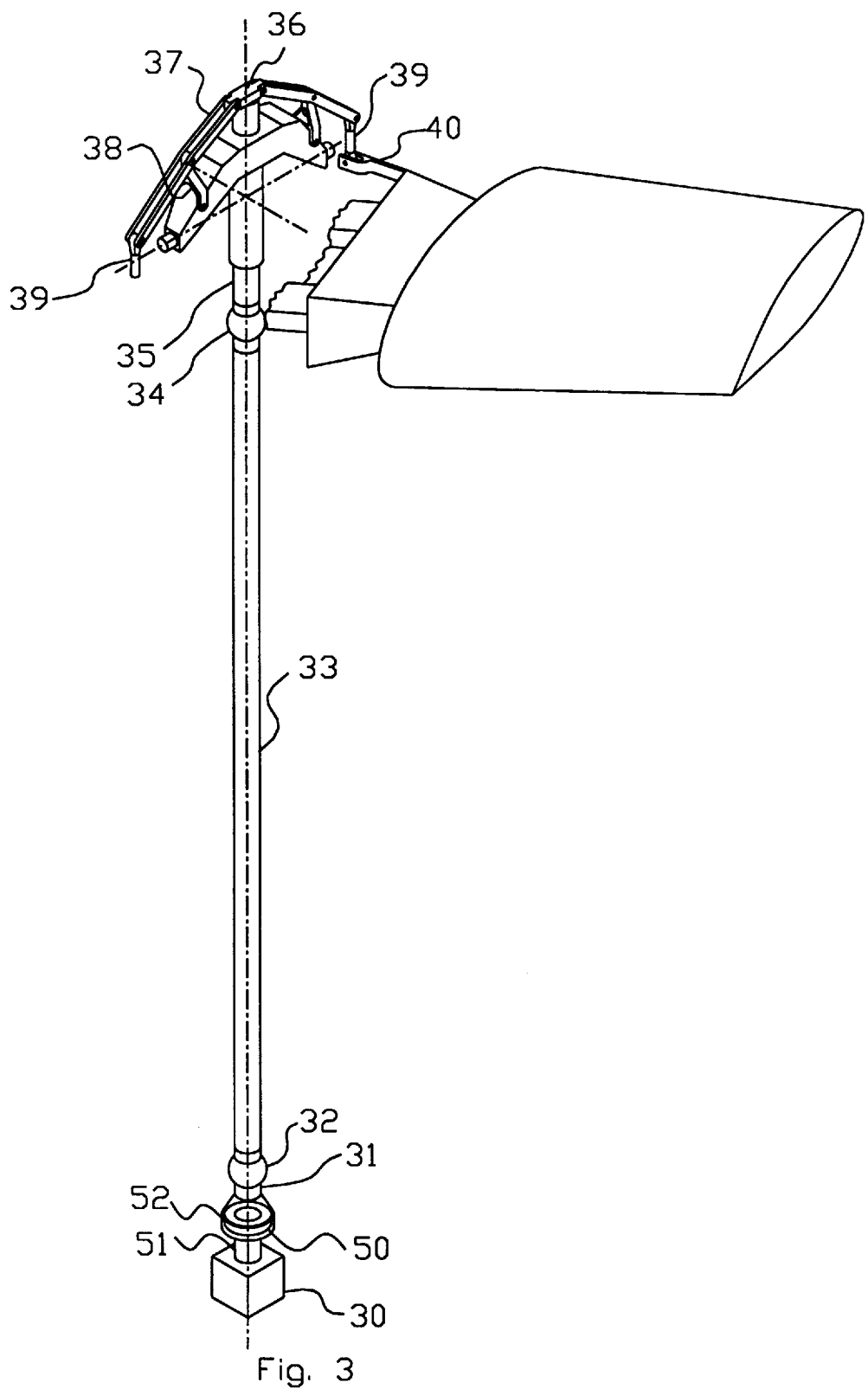
FIG. 3 shows an exploded isometric view of the rotor pitch control mechanism for the rotor head of FIG. 1, omitting the other portions of the rotor head.

FIG. 1 shows a simplified isometric view of the rotor head and drive system of this invention, omitting its pitch control system. The pitch control system, although co-axial with the rotor head and drive system, is essentially independent, and is shown in FIG. 3.

In FIG. 1, rotor spar 1, shown without its surrounding airfoil blades for clarity, is part of a flex-beam rotor as described in the co-pending application entitled Rotor For Rotary Wing Aircraft, identified by Attorney Docket No. 0992RF-008, and having the same filing date, which is incorporated herein by reference. Rotor spar 1 comprises two spar caps which carry all centrifugal forces, and which pass on either side of a hole 1a through which the rotor head and controls pass. The spar caps are parallel to each other at hole 1a and are rectangular composite fiber members. Rotor hub 2 is of machined aluminum and is bolted to rotor spar 1.

Spindle 3 includes a tubular shaft 14 with two opposite projecting arms 16, each arm 16 extending downward and radially outward from the upper end of the tubular shaft 14 and having an outwardly projecting pin 17 located at the end of the arm 16. The pin 17 is received within holes 4 formed in hub 2. Needle bearings (not shown) are provided within holes 4 so that the pins 17 are free to rotate therein. The axis passing through the center of the two pins 17 defines a pivot or teetering axis A. The rotor blade is free to rotate around the teetering axis A. This rotating or see-saw action is known as flapping. The advancing blade flaps up and the retreating blade flaps down, decreasing the angle of attack of the advancing blade and increasing the angle of attack of the retreating blade because the out-of-plane motion of the blades changes the relative wind as seen by each blade. The blade flaps such that both blades create equal lift moments around teetering axis A. The teetering axis A is at a 60 degree angle to the rotor span. This angle, called delta 3, helps to limit the flapping angle because delta 3 decreases the pitch of the advancing blade as it flaps up and increases the pitch of the retreating blade when it flaps down.

The forces of the rotor are carried to the fuselage through a pylon 11. Pylon 11 consists of two identical spaced-apart pylon plates 12 pivoting fore and aft on elastomeric bearings 5 about axis B. The pylon plates 12 are joined together by U-shaped stop plates 13 on either side so that pylon plates 12 always pivot together. Stop plates 13 contact spindle housing 6 to limit movement of pylon 11. Elastomeric bearings 5 are rigidly connected to the aircraft fuselage (not shown) and serve to dampen motion of pylon plates 12 and hold them generally at the midpoint of their travel. Two outward projecting pins 18 of spindle yoke 10 are received within holes 25 located at the upper end of plates 12. Needle bearings (not shown) are provided within the holes 25 to facilitate rotation.

The shaft 14 of spindle 3 turns on a double row ball bearing 9 inside spindle housing 6. Spindle tilt control is applied through pushrods 15 to spindle housing 6, as will be described further on. Spindle housing 6 has two holes 20 containing needle bearings, in which spindle yoke 10 pivots side to side on axis D about outward projecting pins 19. Spindle housing 6 pivots fore and aft on axis C around pins 18. Axis C and axis D of spindle yoke 10 intersect perpendicular to each other and are known as the spindle pivot axes.

Spindle 3 is coupled through a universal joint 7 to drive shaft 8, and finally to drive pulley 21. A belt drive (not shown) connected to an engine (not shown) turns drive pulley 21, as is described in co-pending application "Reduction Drive and Torque-Limiting Clutch for Autogyro Aircraft," identified by Attorney's Docket No. 0992RF-012, filed on the same date, and which is included herein by reference. Universal joint 7 is necessary because drive shaft 8 is not aligned with spindle 3 when spindle 3 is tilted.

Spindle housing 6 has two clevises 26 for attachment of cyclic pushrods 15 through spherical bearing rod ends 22. The spindle tilt is controlled by cyclic pushrods 15 which move in opposite directions for side-to-side rotor tilt and in the same direction for fore-and-aft rotor tilt.

Spindle 3, universal joint 7, drive shaft 8, and drive pulley 21 rotate with the rotor. Spindle housing 6, spindle yoke 10, pylon plates 12, stop plates 13, and idler arms 24 do not rotate with the rotor.

Hinged freely about axis B at the same point on the fuselage as pylon plates 12 (but not hinging on elastomeric bearings 5), is one idler arm 24 for each pylon plate 12. The middle of each idler arm 24 is connected with ball-end pushrods to the lower end of cyclic pushrods 15. Spindle tilt input is provided through slave cylinder 27 and cylinder rods 23, which are connected through ball end pushrods 22 to the outer end of idler arm 24. The pylon plates 12, idler arms 24, spindle housing 6, and cyclic pushrods 15 form a parallelogram which allows the spindle to move fore and aft to absorb vibration without changing spindle tilt, yet also allows spindle tilt to be controlled both fore-and-aft and side-to-side.

FIGS. 2a through 2d illustrate the parallelogram linkage which absorbs fore-and-aft rotor vibration. Fore-and-aft vibration can be pronounced in rotorcraft because the turning blades have oscillating drag loads in forward flight. During forward flight, pylon plates will tilt forward and backward twice per revolution due to the drag imposed on the rotor as it rotates. While the rotor is in the fore and aft position, there will be less drag imposed on the rotor than when it is in the transverse position. The rotor head is allowed to move forward and rearward, as shown by comparing FIG. 2a with 2b and 2c with 2d to reduce loads from being transmitted to the fuselage. A smaller amount of side to side vibration absorption is also necessary when the rotor is between the fore and aft position and the transverse position. Side to side vibration absorption is provided by elastomeric bearings 5 and further by mounting the rotor head in a semi-flexible portion (known as the mast) of the fuselage.

Figure 2A:
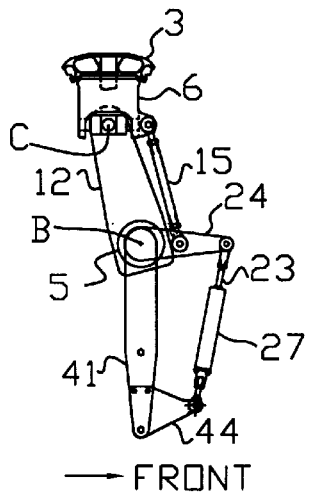
FIG. 2a shows a simplified side view of the parallelogram linkage of the rotor head of FIG. 1, with pylon tilted 15 degrees and the spindle tilted zero degrees.
Figure 2B:
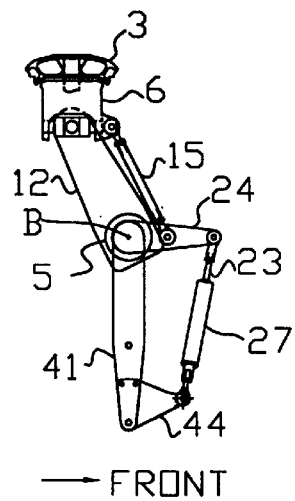
FIG. 2b shows a simplified side view of the parallelogram linkage of FIG. 2a, with the pylon tilted back 27 degrees and the spindle still tilted zero degrees.

In FIG. 2a, we see spindle 3 fully vertical and the parallelogram tilted back 15 degrees, which is the center of its travel of 30 degrees. Spindle 3 will tilt backward (to the left) from this position only in response to pilot's commands, and the parallelogram is tilted backward (to the left) because of drag loads on the particular position of the rotor at that moment during flight. As shown in FIG. 2b, when an increased oscillating drag load occurs on the rotor, it pushes spindle housing 6 further toward the rear of the aircraft, which tilts pylon 11 and is resisted by elastomeric bearing 5. Cyclic pushrod 15 keeps spindle housing 6 at the same angle as it was in FIG. 2a, so that the fore/aft motion of the vibration absorption does not change the tilt of spindle 3, and does not exert any force on cylinder 27 which would be felt by the pilot as long as the teetering axis A (FIG. 1) and the spindle pivot axes (C and D, FIG. 1) are on the same plane. In the actual rotor head shown in FIGS. 5 through 8, the teetering axis A is above the spindle pivot axes C and D, to provide the pilot with a limited amount of vibration feedback about what is happening.

Figure 2C:
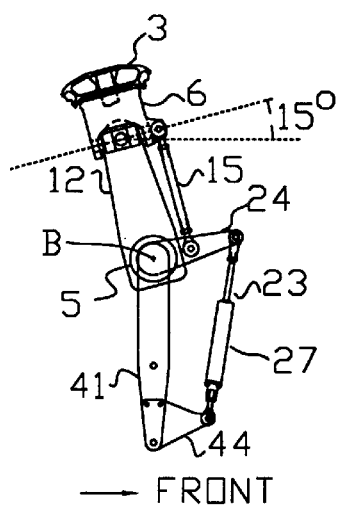
FIG. 2c shows a simplified side view of the parallelogram linkage of FIG. 2a, with the pylon tilted back 15 degrees and the spindle tilted back 15 degrees.
Figure 2D:
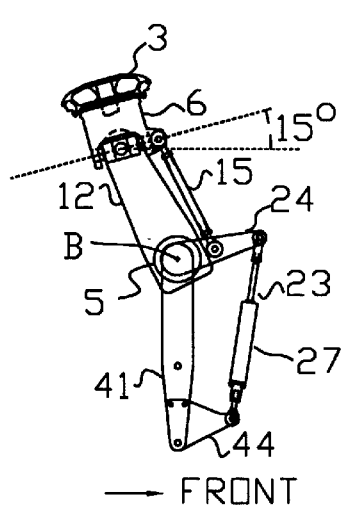
FIG. 2d shows a simplified side view of the parallelogram linkage of FIG. 2a, with the pylon tilted back 27 degrees and the spindle still tilted 15 degrees.

With reference to FIG. 2c, when the pilot commands the spindle 3 to tilt rearward, for example 15 degrees from the position shown in FIG. 2a, cylinder 27 extends pushrod 23, which pushes on cyclic pushrod 15 to tilt spindle housing 6 and spindle 3. As shown in FIG. 2d, oscillating drag loads on the rotor can still tilt pylon 11 further rearward or forward without changing the selected 15 degree tilt of spindle housing 6. Fore and aft vibration is mostly absorbed by elastomeric bearings 45, while a small portion is transformed into a vertical vibration.

Figure 2E:
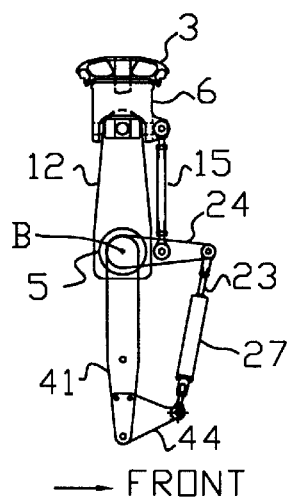
FIG. 2e shows a simplified side view of the parallelogram linkage of FIG. 2a, with the pylon tilted back zero degrees and the spindle tilted back zero degrees.

FIG. 2e shows the position of the spindle 3 and parallelogram during a vertical takeoff when there is no forward air speed. There is no fore and aft cyclic loading occurring as would exist during cruise conditions as shown in FIGS. 2a–2d. The parallelogram follows the resultant of the lift and drag loads on the rotor, and the lift loads are vertical, while there are no horizontal drag loads since the takeoff is vertical.

In FIGS. 2a through 2e, the distance between the spindle pivot axis C and the axis of the upper end of pushrod 15 is the same as the distance between the pylon pivot axis B and the axis of the lower end of pushrod 15, forming a perfect parallelogram. An alternate embodiment might have these two distances different so that spindle housing 6 tilts slightly when pylon 11 tilts, to help limit pylon travel and to provide pilot feedback. That is, the distance between spindle pivot axis C and the axis of the upper end of pushrod 15 may be greater or less than the distance between pylon pivot axis B and the axis of the lower end of pushrod 15.

Not illustrated in FIGS. 2a through 2e are the stops which prevent spindle 3 from tilting too much, and prevent pylon plates 12 from tilting too much. In the actual rotor head shown in FIGS. 5 through 8, spindle 3 tilts from 0 to 15 degrees backwards, and pylon plates 12 tilt from 0 to 30 degrees backwards.

FIG. 3 shows the rotor blade pitch (collective) control system of the rotor head, which passes through the center of the rotor drive and rotor tilt mechanism illustrated in FIG. 1. Pitch control is initiated by a hydraulic cylinder assembly 30 which extends and retracts rod 51. Rod 51 pushes on the inner race of bearing 52. The outer race of bearing 52 is connected to rod 31, which is connected to lower collective shaft 33 by an universal joint 32. Lower collective shaft 33 is connected to upper collective shaft 35 by universal joint 34. Upper collective shaft 35 extends through the axis of rotation of spindle 3 to collective tee 36. A collective arm 37 extends radially outward in each direction from collective tee 36. The inner end of each collective arm 37 is pivotably attached to the collective tee 36, and the outer end is connected by a pushrod 39 to a pitch horn 40. A collective brace 38 is pivotably mounted at its upper end to the midpoint of each collective arm 37 and is pivotably mounted at its lower end to each arm 16 (FIG. 1) of spindle 3, fixing the center of collective arm 37 in relation to the arms 16 of the spindle 3.

When the pilot moves the collective control (not shown) to increase rotor blade pitch, lower collective shaft 33 moves downward, which moves the upper collective shaft 35 downward, which moves collective tee 36 downward, which moves the inner end of collective arm 37 downward. Since collective brace 38 fixes the center of collective arm 37, the outer end of collective arm 37 moves upward, pivoting about the upper end of collective brace 38, and moving pitch horn pushrod 39 upward, increasing the rotor blade pitch. To decrease collective rotor blade pitch, the above action is reversed. The collective shaft 33 and upper collective shaft 35 are moved upward so that the outer ends of collective arms 37 are pivoted downward. The pitch horn pushrod 39 connected to the pitch horn 40 of the rotor blade is thereby moved downward, thus decreasing the pitch of the rotor blade.

The spindle pivot axes C and D (FIG. 1) should be located near the rotor center of lift at average rotor coning. FIGS. 4a and 4b illustrate the effect of different rotor head designs in which the spindle pivot axes are located various distances from the rotor center of lift. They show a rotor 1 immediately after the pilot has commanded a turn by tilting spindle 3 on spindle pivot axis D.

In FIGS. 4a and 4b the rotor center of lift is on the plane E described by the rotor center of lift at average coning. The rotor teetering axis A is on the plane F described by the rotor center of gravity at average coning. The center of lift may be above, below, or on the same plane as the center of gravity of the rotor, depending on the weight distribution along the rotor and the lift distribution along the rotor.

FIG. 4a shows a tilting spindle rotor head like the prior art, where the spindle 3' is tilted around spindle pivot axis D, which is far below the rotor center of lift. The lift of the rotor 1' acts on the teetering axis A. The rotor 1' tends toward perpendicular to the spindle 3' but since the rotor 1' has inertia, it lags behind the spindle 3' tilt. Since the rotor 1' is momentarily still horizontal, the lift force on axis A applies a moment around the spindle pivot axis D, which resists the pilot's control input. The farther the spindle pivot axis D is below the teetering axis A, the larger is the resisting moment, for a given angle of spindle tilt, since the distance indicated by L is greater.

FIG. 4b shows a tilting spindle rotor head like the present invention, where the spindle pivot axis D is only slightly below the rotor center of lift. The lift force on axis A still applies a moment around the spindle pivot axis D, which resists the pilot's control input, but the force is much less than in FIG. 4a because distance L is less. A small amount of force is desirable because it gives the pilot feedback about loads such as those caused by flapping and out of balance. The present invention does not preclude placement of the spindle pivot axis on the center of lift, but this would not provide any control feedback. The spindle pivot axis D could even be placed above the center of lift, but this would be statically unstable and therefore undesirable. The preferred distance perpendicular to rotor disk planes E or F between the left-right spindle pivot axis C and the teetering axis A is less than 1 percent of the rotor radius, and the preferred distance between the fore-aft spindle pivot axis D and the teetering axis A is less than 1 percent of the rotor radius.

FIG. 5 shows a front view of the actual rotor head and control assembly and installation in an aircraft, in which the left half is shown as a section through the axis of rotation. In FIG. 5, the rotor head is supported by support arms 41, which are connected to fuselage 42 by bonding nuts 43. Elastomeric bearings 5 connect pylon plates 12 to support arms 41. Pylon plates 12 pivot fore and aft on elastomeric bearings 5 as previously discussed, and stop plates 13 are welded to pylon plates 12. Stop plates 13 connect the two pylon plates 12 so that they pivot as a single unit. Stop plates 13 also restrict the angle of tilt of spindle housing 6 in the fore and aft direction relative to the pylon plates 12. Pylon stops 48 (FIG. 5 and 6) are connected to pylon plates 12 and contact support arm 41 to limit pylon travel.

On the upper end of pylon plates 12, spindle yolk 10 pivots fore and aft on spindle pivot axis C. Spindle yolk 10 has four cylindrical projections, of which two pivot in the holes 25 of pylon plates 12 forming spindle pivot axis C and two pivot in spindle housing 6 forming spindle pivot axis D. Spindle pivot axes C and D are perpendicular and co-planar. Spindle housing 6 thus pivots side to side on spindle yolk 10, and spindle yolk 10 pivots fore and aft on pylon plates 12, forming a universal joint. The fore-aft and side-to-side tilt of spindle housing 6 is controlled by two pushrods 15 connected to spindle housing 6. The fore-aft tilt was illustrated in FIGS. 2a through 2d.

Spindle housing 6 holds a double row, angular contact ball bearing 9 in which the tubular shaft 14 of spindle 3 rotates. Each arm 16 of spindle 3 has a cylindrical projection 17 at its end which fits into a needle bearing in aluminum hub 2, which is bolted to rotor spar 1. The teetering axis A is located near the center of gravity of the rotor at average coning, a design known in the art as an underslung rotor. Because this rotor has very high inertia and therefore very high centrifugal force relative to the amount of lift, its coning angle is very small and its center of gravity and the teetering axis A is only about an inch above the rotor spar 1 at the center of rotation.

The spindle pivot axes C and D are about ½ inch below the teetering axis A, and thus about one-half inch above the rotor spar 1. This distance is selected to provide some feedback to the pilot about the rotor's condition, but to reduce pilot control forces and isolate the pilot from severe vibration. The dual, separated spar caps of the rotor spar 1 make it possible to locate the spindle pivot axes C and D and the teetering axis A close together because the rotor head can project through the hole 1a in the center of the rotor 1.

A prerotation mechanism accelerates the rotor while the aircraft is on the ground, prior to a vertical takeoff. In this embodiment, the prerotator consists of pulley 21, connected to drive shaft 8, which connects to universal joint 7 which connects to the shaft 14 of spindle 3. During prerotation, universal joint 7 is straight. The prerotation mechanism turns (but is not driven by the engine) during the entire flight, so universal joint 7 follows the tilting of spindle 3 during flight.

The pitch control mechanism includes hydraulic cylinder 30, rod 51, bearing 52, rod 31, universal joint 32, rod 33, universal joint 34, and rod 35 which extends through the center of rotation of spindle 3 to above the rotor. Movement of hydraulic cylinder rod 51 causes movement of rod 35 through the intermediate components listed. At the top of rod 35 is collective tee 36, which raises and lowers the end of collective arms 37. Collective arm supports 38 support the middle of collective arms 37. The outer end of collective arm 37 is connected to pushrod 39, which attaches to the pitch horn on the rotor blade (not shown).

The pitch control mechanism (except hydraulic cylinder 30, rod 51 and the outer race of bearing 50) rotates with the rotor 1 at all times. Universal joint 34 is needed so that the collective pushrod can follow the tilting of the rotor spindle 3. Universal joint 32 is needed since universal joint 34 does not remain centered in drive shaft 8 as the spindle 3 tilts.

FIG. 6 is a side view of the rotor head, in which the left half is a section cut through the axis of rotation. Particularly visible in FIG. 6 are the control linkages. As described earlier, pylon supports 41 are attached to the fuselage 42 (FIG. 5). An arm 44 is attached to each pylon support 41 and is thereby fixed to the fuselage 42. Hydraulic cylinders 27 are controlled by the pilot to tilt the spindle 3 fore and aft and side to side. The bottom end of each hydraulic cylinder 27 is attached to fixed arm 44, and the upper end is attached to idler arm 24. The hydraulic cylinders push or pull on idler arms 24, which by mechanical advantage push or pull pushrods 15 a smaller distance. Idler arms 24 are pivotably attached on the same axis as pylon plates 12, and can pivot relative to pylon plates 12 (axis B). The upper end of pushrods 15 are connected to a clevis 26 on each side of spindle housing 6.

FIG. 7 is a top view of the spindle housing 6, spindle 3, and teeter stop arm 46 and bumper 47. Bumper 47 is attached to the tip of teeter stop arm 46 and prevents the rotor from tilting far enough to hit any airframe component or any internal limit in the rotor head. FIG. 8 shows a section through the elastomeric bearing 45, pylon plate 12 attachment, and idler arm 24, omitting the drive shaft and pitch controls, showing the design and attachment of arm 24.

The invention has significant advantages. The short distance between the teetering axis and the spindle tilt axes results in much less force being required for control during tilting. This short distance is made possible by inserting the spindle through a hole in the rotor, placing the spindle pivot axes above the rotor spar. The parallelogram linkage allows the pylon to oscillate back and forth during flight to reduce oscillating stresses without changing the tilt angle selected by the pilot.

The invention is not limited to the preferred embodiment described above; on the contrary the invention extends to any variant that reproduces the above-described essential characteristics by equivalent means.

What is claimed is:

1. A flexible beam rotor assembly for an aircraft, comprising:

a rotor spar having an axis of rotation and a hole through which the axis of rotation passes;

a spindle which protrudes through the hole in the rotor spar and is rotatable on the axis of rotation, the spindle having a teetering connection to the rotor spar, the teetering connection having a teetering axis above the rotor spar at the rotor axis of rotation; and a spindle housing which is adapted to be nonrotatably mounted to an aircraft, the spindle being rotatably mounted in the spindle housing, the spindle housing adapted to be tiltable in response to pilot control on a left-right spindle pivot axis and a fore-aft spindle pivot axis, the left-right spindle pivot axis and the fore-aft spindle pivot axis being located above the rotor spar at the axis of rotation and below the teetering axis.

2. The rotor assembly as in claim 1, wherein the rotor spar defines a rotor disk and wherein a distance perpendicular to the rotor disk and between the left-right spindle pivot axis and the teetering axis is less than one percent of the rotor spar radius, and a distance between the fore-aft spindle pivot axis and the teetering axis is less than one percent of the rotor spar radius.

3. The rotor assembly as in claim 1, wherein the teetering axis relative to a longitudinal axis of the rotor is less than 90 degrees.

4. In a rotary wing aircraft having a fuselage which has a longitudinal axis, a drive shaft extending upward from the fuselage on an axis of rotation which is transverse to the longitudinal axis, an improved rotor assembly comprising:

a spindle housing nonrotatably mounted to the aircraft;

a spindle which is coupled to the drive shaft and carried rotatably in the spindle housing, the spindle having two teetering arms extending outward relative to the axis of rotation;

a rotor spar pivotally mounted on a teetering axis to the teetering arms for rotation with the spindle, the rotor spar having a hole through which the spindle extends; and the spindle housing being tiltable in response to pilot control on a left-right spindle pivot axis and a fore-aft spindle pivot axis, the left-right spindle pivot axis and the fore-aft spindle pivot axis being located below the teetering axis and above the rotor at the rotor spar axis of rotation.

5. The aircraft according to claim 4, wherein the rotor defines a rotor disk through the rotor spar at the rotor spar axis of rotation and wherein a distance perpendicular to the rotor disk and between the left-right spindle pivot axis and the teetering axis is less than one percent of the rotor spar radius, and a distance perpendicular to the rotor disk and between the fore-aft spindle pivot axis and the teetering axis is less than one percent of the rotor spar radius.

6. The aircraft as in claim 4, wherein the teetering axis relative to a longitudinal axis of the rotor is less than 90 degrees.

7. An aircraft rotor assembly, comprising:

a pylon adapted to be pivotally mounted to a fuselage for fore and aft movement relative to the fuselage due to rotation of a rotor spar during forward flight of the aircraft, the pylon having a pair of spaced apart parallel pylon plates, each having an upper end and a lower end;

a spindle housing attached to and between the upper ends of the pylon plates by a universal joint, the spindle housing being tiltable by pilot control relative to the pylon plates along a fore-aft axis and a left-right axis;

the spindle housing having two control arms positioned on opposite sides of the left-right axis and on the same side of the fore/aft axis;

a pair of pylon arms, each having an inner end and an outer end, the inner end pivotally connected to a lower end of one of the pylon plates on a pylon arm pivot axis;

a pair of pushrods, each having a lower end pivotally connected to the outer end of one of the pylon arms on a pushrod lower end pivot axis and an upper end pivotally connected to one of the control arms of the spindle housing on a pushrod upper end pivot axis; and wherein the pylon plates, spindle housing, pylon arms, and pushrods generally form a parallelogram which allows the spindle housing to move fore and aft to absorb vibration without changing spindle tilt and simultaneously allows spindle tilt to be controlled fore-and-aft and side-to-side.

8. The rotor assembly according to claim 7, wherein a distance between the pylon arm pivot axis and the pushrod lower end pivot axis is substantially the same as a distance between the fore-aft axis and the pushrod upper end pivot axis.

9. The rotor assembly according to claim 7, wherein a distance between the pylon arm pivot axis and the pushrod lower end pivot axis is greater than a distance between the fore-aft axis and the pushrod upper end pivot axis.

10. The rotor assembly according to claim 7, wherein a distance between the pylon arm pivot axis and the pushrod lower end pivot axis is less than a distance between the fore-aft axis and the pushrod upper end pivot axis.

11. In a rotary wing aircraft having a fuselage which has a longitudinal axis, a drive shaft extending upward from the fuselage on an axis of rotation which is transverse to the longitudinal axis, an improved rotor assembly comprising:

a pair of pylon plates pivotally mounted to the fuselage parallel to each other by a bearing which allows fore and aft movement relative to the fuselage to absorb vibration due to rotation of the rotor during forward flight of the aircraft, each of the pylon plates having an upper end and a lower end;

a spindle cross attached to an upper end of the pylon plates, the spindle cross being a universal joint having two bearing pins on a fore-aft axis and two bearing pins on a left-right axis, the bearing pins on the fore-aft axis being pivotally mounted to the upper ends of the pylon plates;

a spindle housing pivotally mounted to the spindle cross on the bearing pins of the left-right axis;

a spindle which is coupled to the drive shaft and carried rotatably in the spindle housing, the spindle housing having two control arms positioned on opposite sides of the left-right axis and on the same side of the fore-aft axis;

a pair of pylon arms, each having an inner end and an outer end, the inner end pivotally connected at a pylon arm pivot axis to a lower end of one of the pylon plates;

a pair of pushrods, each having a lower end pivotally connected at a pushrod lower end pivot axis to the outer end of one of the pylon arms and an upper end pivotally connected at a pushrod upper end pivot axis to one of the control arms of the spindle housing; and wherein the spindle housing is selectively tiltable relative to the fuselage by exerting forces on the control arms, and wherein the pylon plates, spindle housing, pylon arms, and pushrods generally form a parallelogram which allows the spindle to move fore and aft to absorb vibration without changing spindle tilt.

12. The aircraft according to claim 11, wherein a distance between the pylon arm pivot axis and the pushrod lower end pivot axis is substantially the same as a distance between the fore-aft axis and the pushrod upper end pivot axis.

13. The aircraft according to claim 11, wherein a distance between the pylon arm pivot axis and the pushrod lower end pivot axis is greater than a distance between the fore-aft axis and the pushrod upper end pivot axis.

14. The aircraft according to claim 11, wherein a distance between the pylon arm pivot axis and the pushrod lower end pivot axis is less than a distance between the fore-aft axis and the pushrod upper end pivot axis.

15. The aircraft according to claim 11, further comprising:

the spindle having two teetering arms extending outward relative to the axis of rotation;

a rotor spar pivotally mounted on a teetering axis to the teetering arms for rotation with the spindle, the rotor spar having a hole through which the spindle extends; and wherein the fore-aft axis and the left-right axis of the spindle cross are located above the rotor spar at the axis of rotation and below the teetering axis.

* * * * *